United States Patent [19]

Chang

[11] 3,727,197

[45] Apr. 10, 1973

[54] MAGNETIC MEANS FOR COLLAPSING AND SPLITTING OF CYLINDRICAL DOMAINS

[75] Inventor: Hsu Chang, Yorktown Heights, N.Y.

[73] Assignee: International Business Machines Corporation, Armonk, N.Y.

[22] Filed: Dec. 31, 1970

[21] Appl. No.: 103,244

[52] U.S. Cl. ....................... 340/174 TF, 340/174 SR

[51] Int. Cl. ....................... G11c 19/00, G11c 11/14

[58] Field of Search ....................... 340/174 TF

[56] References Cited

UNITED STATES PATENTS

| | | | |
|---|---|---|---|
| 3,555,527 | 1/1971 | Perneski | 340/174 TF |
| 3,597,748 | 8/1971 | Bonyhard et al | 340/174 TF |
| 3,644,908 | 2/1972 | Bobeck | 340/174 TF |
| 3,680,067 | 7/1972 | Chow | 340/174 TF |

OTHER PUBLICATIONS

R. Electronics, "Magnetic Bubbles–a Technology In the Making" by Karp; 9/1/69; p. 83–87

*Primary Examiner*—Stanley M. Urynowicz, Jr.
*Attorney*—Hanifin and Jancin and Jackson E. Stanland

[57] ABSTRACT

A very simple means for splitting or collapsing cylindrical domains which can be located anywhere on a magnetic sheet in which the domains exist. Soft magnetic materials such as permalloy are used to create strong local magnetic fields which act on the domains to split or collapse them. In one embodiment, the permalloy elements are located on both sides of the magnetic sheet, while in another embodiment these elements are located on the same side of the magnetic sheet. No extra external power (current or magnetic field) is required in these devices; the propagation field is sufficient to establish the required energy for splitting or collapsing domains.

13 Claims, 23 Drawing Figures

DOMAIN EXPANDS

DOMAIN TRAPPED

DOMAIN COLLAPSES

INVENTOR
HSU CHANG

BY J.E. Stanland
AGENT

FIG. 3 SPLITTER
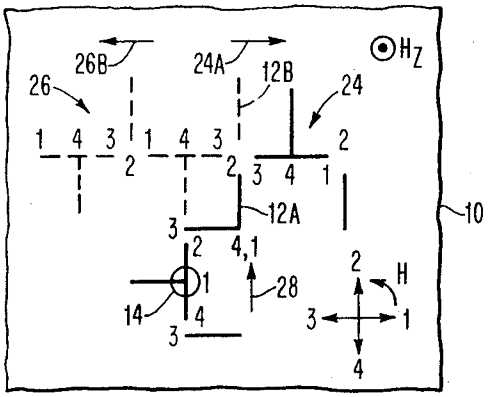
FIG. 3A
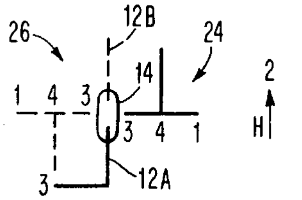
FIG. 3B
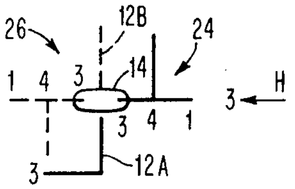
FIG. 3C
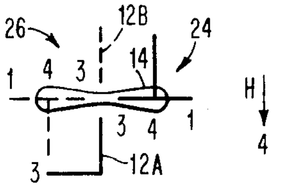
FIG. 3D
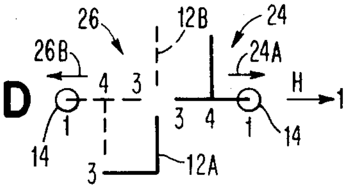
FIG. 4 SPLITTER
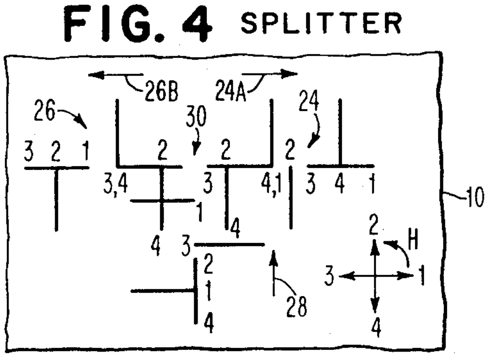
FIG. 5A
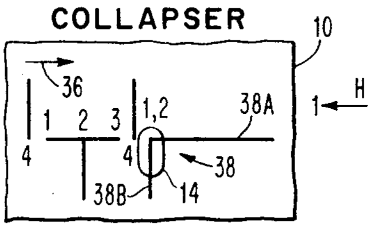
FIG. 4A
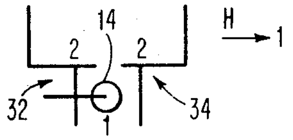
FIG. 5B
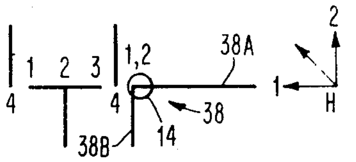
FIG. 4B
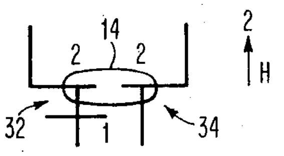
FIG. 5C
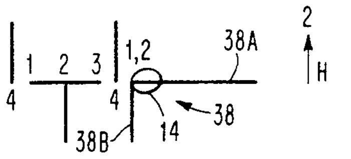
FIG. 4C
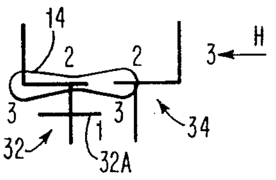
FIG. 5D
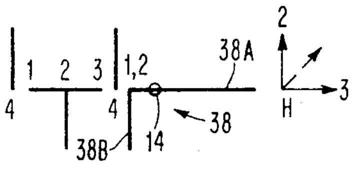
FIG. 4D
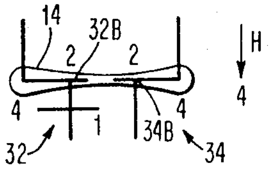

MAGNETIC MEANS FOR COLLAPSING AND SPLITTING OF CYLINDRICAL DOMAINS

BACKGROUND OF THE INVENTION

1. Field of the Invention

This invention relates to simple magnetic structures for splitting or busting cylindrical domains which can be located anywhere on the magnetic sheet in which the domains are propagating, and which do not require any externally created power for performing these functions.

2. Description of the Prior Art

Cylindrical magnetic domains are discussed in an article by A. H. Bobeck et al, in *IEEE Transactions on Magnetics*, MAG-5, No. 3, September 1969,, at page 544. These domains are characterized by a single wall and can be propagated throughout a magnetic sheet in which they exist. A Stablizing magnetic field is applied normal to the magnetic sheet for maintaining the diameter of the cylindrical domains.

In useful cylindrical domain structures, the presence and absence of domains are used to indicate binary 1 or 0. In these devices, it is sometimes desirable to be able to collapse domains to remove the information content represented by the domains. Further, it is useful to be able to divide domains into at least two new domains, one of which can be used to provide a output signal while the other can be returned to the device in which it represents information. For instance, it is desirable to have shift-register loops in which the domains continually circulate. Readout of the information content of the shift registers is achieved by passing the domain to a domain splitter in which it is divided into two new domains. One of these goes to an output device which senses the presence of the domain while the other is returned to the loop to continue circulation therein. Thus, non-destructive readout of the shift register contents is possible.

There are known techniques for collapsing or splitting cylindrical magnetic domains. One particular means for splitting cylindrical domains is that described on page 556 of Perneski, *IEEE Transactions on Magnetics*, MAG-5, No. 3, September 1969. A permalloy disc has a cylindrical domain attached to it. As the in plane magnetic field rotates, the domain is stretched around the periphery of the disc and is attracted by the propagation means, such as a T and I bar channel. As the rotating propagation field continues through its cycle, the domain will be stretched and will undergo a pinching effect at its center, causing it to split. Half of the domain remains on the permalloy disc while the other half moves along the propagation channel in response to the rotating, in-plane magnetic field.

There are disadvantages associated with the disc means for splitting a domain. This structure requires a large amount of space and requires large magnetic fields since the domain is stretched considerably with respect to its initial size. Further, since the domain is stretched around the periphery of the disc, the actual splitting operation requires a large amount of time. Because the disc requires a considerable amount of space, it cannot be easily placed anywhere on the magnetic sheet in relation to individual devices (logic, memory, etc.). Because of this, it is generally located at the beginning of a propagation channel for use as a bubble domain generating device.

Another type of domain splitter is the replication loop described by Bobeck et al, ibid., at page 550. This circuit is used in conjunction with conductive propagation loops. The domain is brought to the center of a propagation loop in which a replication loop is located. A current in the replication loop provides a magnetic field which splits the bubble domain. This structure has disadvantages because additional currents are required, thereby increasing power dissipation. There is also the necessity to provide currents other than those used for the normal propagation functions.

Various techniques are known for collapsing a bubble domain. One of these uses the stabilizing bias field. If this field is increased beyond a certain amount, all the cylindrical domains in the magnetic sheet will be collapsed. However, selective collapse of particular bubbles cannot be achieved this way.

Another technique for collapsing domains requires heat treatment above the Neel temperature. If an antiferromagnetic platelet (e.g., an orthoferrite) is heated above its Neel temperature and then cooled in a magnetic field normal to the platelet, the platelet will be saturated and will be void of reverse cylindrical domains. This technique has the disadvantage of requiring a heating step in combination with the additional magnetic field. Consequently, it is a relatively slow way of removing domains and requires additional hardware and energy inputs to achieve the function.

From the above, it is apparent that the prior art techniques for splitting and collapsing cylindrical magnetic domains are not totally useful in practical bubble domain devices. It is desirable to provide simple, inexpensive structures for splitting and collapsing domains which can be located anywhere on the magnetic sheet in which the domains exist. That is, it should be possible to provide the splitting or collapsing function at selective locations on the magnetic sheet. It is also desirable that additional energy inputs are not required and that the splitters and collapsers are sufficiently fast so as not to impede the operation of the devices with which they are associated. It is further necessary that the splitting and collapsing devices do not require a large amount of space and can be fabricated by the same fabrication techniques used to deposit the associated devices. The prior art devices for achieving these functions do not satisfy all these criteria and each has its particular disadvantages.

Accordingly, it is a primary object of this invention to provide simple, inexpensive devices which can split or collapse cylindrical magnetic domains.

It is another object of this invention to provide splitting and collapsing devices for cylindrical domain technology which require no power or energy inputs other than those already present to achieve the splitting and collapsing functions.

It is still another object of this invention to provide a magnetic structure for splitting or collapsing cylindrical domains which can be fabricated at the same time as propagation circuitry for these domains is fabricated.

It is a further object of this invention to provide magnetic devices for splitting and collapsing cylindrical domains which are fast and efficient, requiring only small magnetic fields.

It is a still further object of this invention to provide devices for splitting and collapsing cylindrical magnetic domains which do not require large amounts of space and which can be used in association with other magnetic cylindrical domain devices.

The foregoing and other objects, features, and advantages of the invention will be apparent from the following more particular description of the preferred embodiments of the invention as illustrated in the accompanying drawings.

SUMMARY OF THE INVENTION

Soft magnetic materials are prepared as overlays on a magnetic sheet in which bubble domains can be propagated. For instance, permalloy T and I bar elements are used to propagate magnetic domains and also to provide splitting and collapsing functions. These elements provide entrapment of cylindrical domains during rotation of the in-plane magnetic propagation field. The elements also provide magnetic field concentrations useful for splitting and collapsing cylindrical domains. Thus, these elements create magnetic fields which add to or subtract from the stabilizing magnetic field normal to the sheet in which the domains are propagated.

Means are also provided to stretch the cylindrical domain while it is being pinched at its center in order to split the domain. The magnetic means which provides the necessary magnetic fields can be any soft magnetic material, such as permalloy. These elements can be deposited at the same time as the propagation circuitry and do not require additional magnetic fields or additional currents in order to operate successfully. The elements create localized magnetic fields of proper direction which act on individual magnetic domains. Consequently, these structures can be placed anywhere on the magnetic sheet and do not interfere with the operation of the magnetic devices with which they are to be associated.

In one embodiment, permalloy bars are located on each side of the magnetic sheet. In response to a rotating, in-plane magnetic field, these permalloy bars will create a magnetic field normal to the plane of the magnetic sheet. Depending upon the cycle of the rotating propagation field, the normal field produced by the elements is in the direction of magnetization of the domain or opposed to it. Thus, it is possible to diminish the stabilizing field or add to it. This in turn causes an expansion or contraction of the cylindrical domain. The permalloy elements will trap the domain so that it will remain under the influence of the magnetic fields locally created by these elements. If additional escapement means are provided, there will be stretching forces on the domain at the same time the normal field created by the domain is affecting the domain. Thus, splitting functions can be provided.

In another embodiment, soft magnetic material such as permalloy is deposited on one side of the magnetic sheet. This deposition is during the same time as the propagation means are being deposited. If the permalloy elements are properly designed, a cylindrical domain will be entrapped during its propagation and will undergo a destructive magnetic field which is directed normal to the magnetic sheet. This normal magnetic field will cause collapse or splitting of the domain.

Thus, entirely magnetic means can be deposited at the same time as the propagation means (T and I bars). The magnetic splitting and collapsing means trap the bubble (cylindrical) domain and exert a normal magnetic field on it. In addition, means can be provided to stretch the domain at the same time the normal component is being exerted on it. The stretching means is also comprised of magnetic material that acts only under the influence of the propagation field.

BRIEF DESCRIPTION OF THE DRAWINGS

FIG. 2C–1 is a cross-sectional view of the device of FIG. 2C, when the propagation field is in the direction indicated.

FIG. 2E–1 is a cross-sectional view of the structure of FIG. 2E, showing the influence of the locally created magnetic field on the domain for a particular rotation of the in-plane propagating field.

FIG. 3 is an illustration of a domain splitter using a double overlay of soft magnetic material, according to the concept illustrated in FIG. 1A.

FIGS. 3A–3D show the operation of the splitter of FIG. 3, during various positions of rotation of the rotating, in-plane magnetic propagation field.

FIG. 4 is an illustration of a domain splitter using only a single overlay of soft magnetic material on the magnetic sheet in which the domains propagate.

FIGS. 4A–4D illustrate the splitting function in the device of FIG. 4 for various rotational positions of the propagation field.

FIGS. 5A–5D show a domain collapser using a single magnetic overlay on a magnetic sheet in which the domains propagate, illustrating the collapsing functions for various rotational positions of the propagation field.

DESCRIPTION OF THE PREFERRED EMBODIMENTS

Figure 2A:
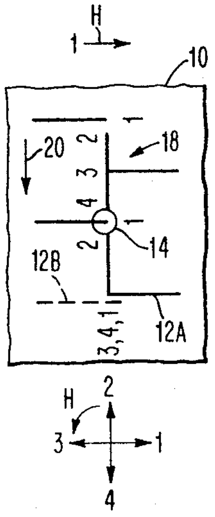
FIGS. 2A–2E show the operation of a bubble domain collapser in accordance with the structure of FIG. 1A, for various increments of rotation of the in-plane magnetic propagation field.
Figure 2B:
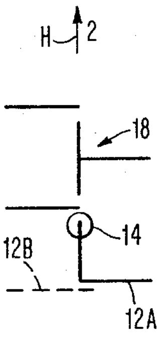
Figure 2C:
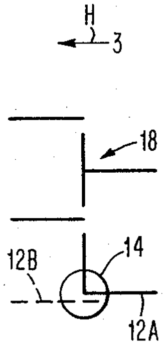
Figure 2D:
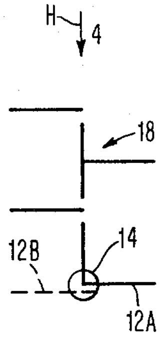
Figure 2E:
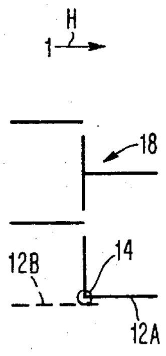
Figures 1, 2C:
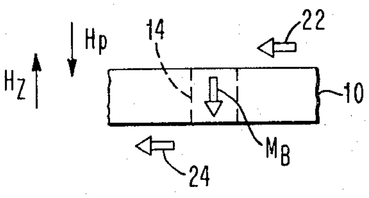
Figures 1, 2E:
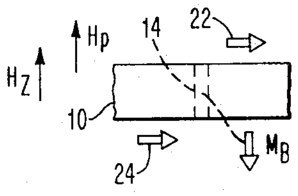

FIG. 1 is a schematic illustration of a double overlay device for splitting or collapsing a cylindrical domain. A magnetic sheet 10 in which cylindrical domains exist and can be propagated has deposited thereon soft magnetic material 12A and 12B. The magnetic material used for 12A and 12B is conveniently permalloy, while the magnetic sheet 10 can be comprised of any of a variety of well known domain propagation materials, such as orthoferrites and garnets.

Under the influence of a rotating magnetic field H, domains can be propagated within magnetic sheet 10, as is well known in the art. Rotating, in-plane field H can be provided by well known means, such as external coils. A stabilizing magnetic field $H_z$ exists normal to the plane of magnetic sheet 10 and is used to stabilize the diameter of the cylindrical domains. The field $H_z$ can be provided in many ways, as for instance by externally located coils, which are not shown here. The use of the stabilizing field and its creation is well known in the art, as can be seen by reference to the aforementioned prior art.

Figure 1A:
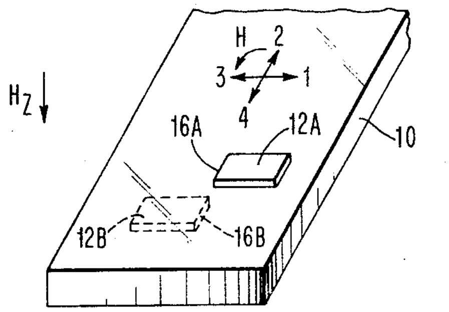
FIG. 1A is a schematic illustration of a simplified cylindrical domain splitter or collapser using magnetic material deposited on both sides of the magnetic sheet in which the domains exist.
Figure 1B:
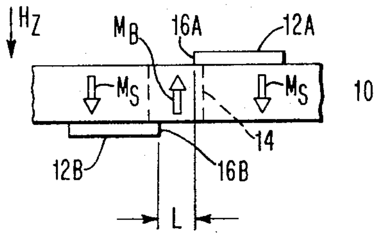
FIG. 1B is a cross-sectional view of the structure of FIG. 1A, showing a cylindrical domain entrapped by the splitting and collapsing means.

FIG. 1B is a cross-sectional view of the structure of FIG. 1A, in which a cylindrical domain 14 is trapped by permalloy elements 12A, 12B. As is apparent, the magnetization $M_B$ of the domain 14 is oppositely directed to the magnetization $M_s$ of magnetic sheet 10. The permalloy elements 12A and 12B are bars which are deposited on magnetic sheet 10 and are shown as having a separation L. This separation can be zero, and the elements can be overlapped for some applications.

At certain rotational positions of the propagation field H, the poles (ends) of elements 12A and 12B will be magnetized. This will create a magnetic field between the poles of elements 12A and 12B. Generally, it is desirable that the magnetic field $H_p$ created by the elements 12A and 12B be as concentrated as possible. If there is large spreading of the magnetic field lines between element 12B and element 12A, it is desirable to overlap these elements. That is, a portion of element 12A will be over a portion of element 12B.

The phenomena of magnetic curling can occur if the length of the elements 12A and 12B is small (2, 3 microns). If this is the case, a magnetic field H in the direction 1 or 3 (FIG. 1A) will not cause all the magnetization vectors in elements 12A and 12B to align along the direction 1 or 3, respectively. Instead, some of these magnetization vectors will be arranged transversely to direction 1 or 3, especially at the pole ends 16A and 16B of elements 12A and 12B, respectively. If the elements are long, the length of them in which curling occurs is small in comparison to domain size and total element length. However, if the elements are short, then the length of the elements in which curling occurs is large with respect to the domain size and total element length. In this latter case, overlap of elements 12A, 12B is desirable. Essentially, the magnetic field lines will not leave the end of one of the elements 12A or 12B and then enter the end of the other element 12B or 12A, respectively. A spreading will result in which the magnetic field lines between these elements will exist over an extended area measured in a direction parallel to the spacing L.

When this occurs, it is desired to overlap elements 12A and 12B to increase magnetic field concentration. When fabricating the elements 12A and 12B, these elements are positioned with a spacing L, or no spacing ($L = 0$), or overlap consistent with the relationship that the field $H_p$ produced by the elements 12A and 12B adds to the stabilizing field $H_z$ so that the resultant field is equal to or greater than the threshold field $H_t$ required for collapse. That is, $$H_z + H_p \geq H_t$$

The field $H_p$ produced by elements 12A and 12B does not have to be as large when it is desired to pinch the center of a domain during a splitting operation as it should be when it is desired to completely collapse the domain. During the splitting function, the domain is being stretched by forces exerted along the plane of the magnetic sheet 10 so that it is only necessary that the combined stretching and pinching forces be sufficient to split the domain. When the domain is to be collapsed, the field $H_p$ must be sufficient to produce a field greater than $H_t$.

The field $H_p$ is a function of the thickness of magnetic sheet 10, the thickness of elements 12A and 12B, the geometry of these elements, and the propagation field H before saturation of the material in elements 12A and 12B. Generally, the propagation field H will be established with respect to the magnetic propagation means (such as T and I bars) which are to be used for domain movement. Given this propagating field, permalloy elements 12A and 12B are designed to provide a sufficient field $H_p$ for splitting or collapsing a domain which is entrapped by these elements.

In order to more fully understand the operation of this simple magnetic splitting and collapsing means, reference is made to FIGS. 2A–2E. Where possible, the same reference numerals will be used for FIGS. 2A–2E as were used for FIGS. 1A and 1B. This usage of common reference numerals will be continued in the subsequent figures also. In FIG. 2A, a portion of a propagation means 18 is shown comprising well known T and I bar elements. The propagation field H has a counterclockwise rotation. The cylindrical domain 14 will move in the direction of arrow 20 under the influence of the magnetic charges established by the propagation field H in each of the T and I bar elements.

The L-bar corresponds to element 12A of FIG. 1A while element 12B is indicated by the dashed line. The T and I bars are located on magnetic sheet 10, as is element 12A, while element 12B is located on the opposite side of magnetic sheet 10. In a preferred embodiment, all T and I bars, as well as elements 12A and 12B, are permalloy. They have a thickness and width, but are shown as single lines for ease of explanation. Again, permalloy T and I bar elements are well known in the art and will have dimensions corresponding to the dimensions of the domains to be used. Element 12B is shown slightly displaced from element 12A, although it should be understood that element 12B is aligned with element 12A. In this diagram, these elements overlap, although the criterion for this has been explained with respect to FIG. 1B.

FIGS. 2B–2E show the collapse operation of the domain as the propagation field H rotates. In FIG. 2B, domain 14 moves onto L-bar 12A when the field H is in the direction indicated by arrow 2. The domain moves to the elbow of L-bar 12A when the field moves to position 3. At the elbow, the magnetic field $H_p$ produced by permalloy elements 12A and 12B is oppositely directed to the stabilizing field $H_z$. This means that domain 14 will expand. This is indicated in FIG. 2C–1, which is a cross-sectional view of FIG. 2C when the propagation field H is in the direction indicated by arrow 3. Arrows 22 and 24 indicate the magnetization of elements 12A and 12B, respectively. This magnetization is in response to propagation field H and creates a normal field $H_p$.

In FIG. 2D, the domain 14 remains trapped at the elbow because the magnetic field H in direction 4 creates a positive pole at the elbow. Thus, the structure is a trapping means for the domain so that the splitting or collapsing function can be achieved.

In FIG. 2E, the field $H_p$ produced by elements 12A and 12B is in the direction of the stabilizing field $H_z$ and is sufficient to create a total field normal to magnetic sheet 10 greater than the threshold field $H_t$ required to collapse the domain. Consequently, the domain collapses when the propagation field rotates to the direction indicated by arrow 1. This is illustrated in FIG. 2E–1.

FIG. 3 shows a cylindrical domain splitter using a double overlay of soft magnetic material, which can be permalloy. The elements 24 shown in solid lines are permalloy elements deposited on the top of magnetic sheet 10, while those 26 shown in dashed lines are located on the bottom of sheet 10. A stabilizing field $H_z$ is directed upwardly, normal to magnetic sheet 10. Propagation occurs under the influence of rotating magnetic field H which is parallel to the plane of sheet 10.

The domains 14 initially travel in the direction of arrow 28. They enter L-bar 12A and are trapped in pole position 2 of this element. The domain is then split and the two split portions travel in the directions indicated by arrows 24A and 26B. That is, under the influence of the rotating propagation field H and propagation means 24 (comprising T and I bar elements), domains will travel in the direction of arrow 24A. Also, propagation means 26 (comprised of T and I bar elements located on the underside of sheet 10) will cause domains to move in the direction of arrow 26B under the influence of rotating magnetic field H.

Propagation means 24 and 26 comprise the stretching means for domains which are trapped between elements 12A and 12B. The magnetic field produced between elements 12A and 12B provides the pinching field $H_p$ while the stretching forces are provided by propagation means 24 and 26.

Operation of the domain splitter is illustrated in FIGS. 3A-3D. In FIG. 3A, domain 14 is located between elements 12A and 12B when propagation field H is in the direction indicated by arrow 2. When the propagating field rotates to position 3 (FIG. 3B) the domain is pulled in opposing directions by propagation means 24 and 26. Thus, the domain becomes elongated. In FIG. 3C, the propagation field H is now in direction 4 and the domain 14 is further stretched by propagation means 24 and 26. In addition, a pinching field $H_p$ normal to magnetic sheet 10 is exerted on the center of domain 14. The combination of the stretching and pinching forces causes the domain to split into two parts, one of which propagates in the direction of arrow 24A while the other propagates in the direction of arrow 26B. (FIG. 3D)

FIG. 4 illustrates a domain splitter using only a single overlay of soft magnetic material, preferably permalloy. As with the other embodiments, the propagation means comprises T and I bars located on magnetic sheet 10. Propagation of domains is in response to magnetic charges established on the T and I bar elements when the propagation field H rotates in the plane of magnetic sheet 10. Using similar reference numerals to those used in FIG. 3, the domain enters the splitter 30 in the direction of arrow 28. The domain will be trapped in splitter 30 and will be broken into two portions, one of which travels in the direction of arrow 24A while the other travels in the direction of arrow 26A. Movement in these directions is caused by propagation means 24 and 26, respectively. As before, the propagation means comprises magnetic T and I bars.

The operation of the splitter of FIG. 4 for various rotations of propagation field H is shown in FIGS. 4A–4D. In FIG. 4A, propagation field H is in the direction indicated by arrow 1 and the domain 14 is located on element 32. This element is a combination of T and I bars, variously arranged as shown. Element 34 is the other part of the splitting means. Upon rotation of propagation field H to direction 2, domain 14 is moved to a position overlapping elements 32 and 34 (FIG. 4B). When propagation field H rotates to direction 3, domain 14 is stretched in the direction of arrow 26A because of the attractive pole established by position 3 of element 32 (FIG. 4C). During this position of field rotation, a pinching effect on domain 14 will be established by the negative magnetic pole located on portion 32A of element 32. When the propagation field H rotates to position 4, the domain 14 will be further stretched and a pinching force will be created at positions 32B and 34B. Under the combined actions of the stretching and pinching forces, the domain will be split and separate domains will propagate in the directions indicated by arrows 24A and 26A as magnetic field H rotates to position 1.

FIG. 5A shows a domain collapser using only a single overlay of magnetically soft material on magnetic sheet 10. In this embodiment, domains 14 propagate in the direction of arrow 36 in response to rotating propagation field H. The propagation means comprises permalloy T and I bar elements and the domain collapser is an L-shaped member 38. This member is also comprised of a soft magnetic material such as permalloy. A portion 38A of the element 38 is longer (e.g., approximately 2 ½–3 times) than portion 38B.

In FIG. 5A, domain 14 is located at the elbow of element 38, when magnetic field H is in the direction 1. As the magnetic field H rotates between positions 1 and 2, domain 14 is trapped at the elbow of element 38 because positive magnetic poles are created there. However, as field H rotates toward position 3, the magnetic pole established at the elbow becomes negative and exerts a normal field $H_p$ which adds to the stabilizing field $H_z$. This field, in combination with stabilizing field $H_z$, is sufficient to collapse the domain 14. As shown in FIG. 5D, the domain 14 does not travel to the right-hand end of 38A, since the pole created there is too distant to influence domain 14. Thus, the single overlay magnetic elements are sufficient to provide the collapsing function anywhere on magnetic sheet 10.

What has been shown is a very simple entirely magnetic element for splitting or collapsing cylindrical magnetic domains. The structure may be located anywhere on the magnetic sheet and can be used in combination with the magnetic devices (such as memory and logic) which are also located on the magnetic sheet. No additional input power is required, the propagation field being sufficient to provide the necessary forces for splitting or collapsing a domain. These structures for splitting and collapsing do not interfere with the normal operation of devices located on the magnetic sheet and comprise only a small area on the sheet. They can be fabricated at the same time the devices themselves are fabricated and can be comprised of the same material. Whereas previous devices of a similar nature required additional power inputs and large space requirements, the structures described herein are easily incorporated on the magnetic sheet, thereby enabling complete on-sheet systems to be established. Of course, it will be recognized by those skilled in the art that other designs for the splitting and collapsing elements may be envisioned but the principles of using magnetic elements and existing magnetic propagation fields to provide the splitting and collapsing functions will remain.

What is claimed is:

1. A magnetic device for magnetic bubble domains, comprising:
- a magnetic sheet in which said domains exist,
- bias means for providing a magnetic bias field substantially normal to said sheet,
- means for producing a reorienting magnetic field in the plane of said magnetic sheet,
- first elements comprised of magnetically soft material located adjacent said magnetic sheet, said elements being comprised of both connected and separate bars of said magnetically soft material for creation of magnetic poles in discrete locations defined by said elements in accordance with the direction of said reorienting magnetic field, said elements providing localized magnetic fields substantially parallel to said bias field of magnitude sufficient to collapse domains located at said discrete pole.

2. The device of claim 1, where said elements are comprised of permalloy.

3. The device of claim 1, where said elements are located on opposite sides of said sheet.

4. The device of claim 1, where said first elements include a L-shaped element for collapse of said domains at the elbow thereof in response to the orientation of said in-plane magnetic field.

5. The device of claim 1, further including second elements comprised of bar shaped segments for provision of discrete magnetic poles in response to the direction of said reorienting magnetic field for attraction of said domains while said domains are held by said first elements.

6. The device of claim 5, where said first and second elements are located on the same side of said magnetic sheet.

7. A magnetic device for magnetic bubble domains comprising:
- a magnetic sheet in which said domains exist,
- bias means for providing a magnetic bias field substantially normal to said magnetic sheet,
- means for providing a reorienting magnetic field in the plane of said magnetic sheet,
- a plurality of first elements for provision of discrete magnetic poles in response to the orientation of said in-plane magnetic field, said elements being comprised of straight line segments of magnetically soft material adjacent said magnetic sheet, said elements providing localized magnetic fields substantially parallel to said bias magnetic field of magnitude sufficient to collapse said domains which are located at selected ones of said magnetic pole locations.

8. The device of claim 7, where said elements are comprised of permalloy.

9. The device of claim 7, where said elements are located on opposite sides of said sheet.

10. The device of claim 7, where said first elements include elements for provision of discrete magnetic poles for trapping said domains during multiple sequential orientations of said in-plane magnetic field.

11. The device of claim 10, including second elements of magnetically soft material providing attractive magnetic poles for said domain during said collapse.

12. The device of claim 11, where said first and second elements are comprised of permalloy.

13. The device of claim 11, where said first and second elements are located on the same side of said magnetic sheet.

* * * * *